(12) United States Patent
Fukushima et al.

(10) Patent No.: US 7,838,616 B2
(45) Date of Patent: Nov. 23, 2010

(54) PERFLUOROPOLYETHER RUBBER COMPOSITION AND ION-CONDUCTING POLYMER ELECTROLYTE MEMBRANE

(75) Inventors: Motoo Fukushima, Annaka (JP); Masaaki Yamaya, Annaka (JP); Akira Yamamoto, Annaka (JP); Shinichi Sato, Annaka (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 437 days.

(21) Appl. No.: 11/924,181

(22) Filed: Oct. 25, 2007

(65) Prior Publication Data

US 2008/0107950 A1    May 8, 2008

(30) Foreign Application Priority Data

Nov. 2, 2006 (JP) .............................. 2006-298447

(51) Int. Cl.
*C08G 77/12* (2006.01)

(52) U.S. Cl. .............................. 528/31; 528/32; 528/42; 429/482; 429/494

(58) Field of Classification Search .................. 528/31, 528/42; 429/33
See application file for complete search history.

(56) References Cited

U.S. PATENT DOCUMENTS

| | | | |
|---|---|---|---|
| 5,665,846 | A | 9/1997 | Sato et al. |
| 6,512,041 | B2 | 1/2003 | Osawa et al. |
| 7,087,673 | B2 | 8/2006 | Matsuda et al. |
| 7,316,854 | B2 * | 1/2008 | Arai .............. 429/33 |
| 2003/0181615 | A1 * | 9/2003 | Ameduri et al. .......... 526/227 |
| 2005/0112434 | A1 * | 5/2005 | Park et al. ................ 429/30 |
| 2005/0209392 | A1 * | 9/2005 | Luo et al. ................. 524/496 |
| 2006/0049167 | A1 * | 3/2006 | Yang et al. ............... 219/388 |

FOREIGN PATENT DOCUMENTS

| | | |
|---|---|---|
| JP | 8-199070 | 8/1996 |
| JP | 2000-7835 | 1/2000 |
| JP | 2001-106893 | 4/2001 |
| JP | 2002-184427 | 6/2002 |
| JP | 2003-201401 | 7/2003 |
| JP | 2005-89682 | 4/2005 |
| JP | 2006-131770 | 5/2006 |
| JP | 2006-256741 | 9/2006 |
| JP | 2007-176968 | 7/2007 |

OTHER PUBLICATIONS

Masahiro Tatsumisago, et al., "Proton-Conducting silica-gel films doped with a variety of electrolytes". Solid State Ionics, vol. 74., 1994, pp. 105-108.

S. Mikhailenko, et al., "Solid electrolyte properties of sulfonic acid functionalized mesostructured porous silica", Microporous and Mesoporous Materials, vol. 52., 2002, pp. 29-37.

* cited by examiner

*Primary Examiner*—Melvin C Mayes
*Assistant Examiner*—Melissa Stalder
(74) *Attorney, Agent, or Firm*—Oblon, Spivak, McClelland, Maier & Neustadt, L.L.P.

(57) ABSTRACT

A perfluoropolyether rubber composition is useful for forming a polymer electrolyte membrane, comprising (A) an alkenyl-containing perfluoropolyether, (B) a silicon-oxygen crosslinked structure having ionic conduction, and (C) a peroxide crosslinker. The silicon-oxygen crosslinked structure is obtained by simultaneously effecting oxidation and hydrolysis on an organoxysilane having an epoxy group and an organoxysilane having a mercapto group for thereby converting the mercapto group into a sulfonic group, and neutralizing the resulting sulfonic group-containing siloxane with a nitrogen-containing compound.

5 Claims, No Drawings

PERFLUOROPOLYETHER RUBBER COMPOSITION AND ION-CONDUCTING POLYMER ELECTROLYTE MEMBRANE

CROSS-REFERENCE TO RELATED APPLICATION

This non-provisional application claims priority under 35 U.S.C. §119(a) on Patent Application No. 2006-298447 filed in Japan on Nov. 2, 2006, the entire contents of which are hereby incorporated by reference.

TECHNICAL FIELD

This invention relates to a perfluoropolyether rubber composition and an ion-conducting polymer electrolyte membrane formed therefrom. More particularly, it relates to a perfluoropolyether rubber composition which can form a polymer electrolyte membrane having both strength and ionic conduction and finding use as an ion-conducting membrane in fuel cells, water electrolysis, hydrogen halide electrolysis, brine electrolysis, oxygen concentrators, humidity sensors, gas sensors, etc., and an ion-conducting polymer electrolyte membrane formed therefrom.

BACKGROUND ART

Ion-conducting materials are capable of strongly bonding with certain ions or allowing for selective permeation of certain cations or anions. Because of this nature, they are processed into particulate, fiber or membrane form and utilized in a variety of applications including electrodialysis, diffusion dialysis, and cell diaphragms. For example, polymer electrolyte fuel cells (PEFCs) are constructed such that a fuel such as hydrogen or methanol is electrochemically oxidized in the cell using a polymer electrolyte membrane, whereby the chemical energy of the fuel is directly converted into the electric energy which is extractable out of the cell. The PEFCs are now of great concern as a clean electric energy source. In particular, polymers having functional groups such as sulfonic groups within the polymer chain are expected to be a potential power source material for electric vehicles because they can form proton-conducting membranes with high outputs and low-temperature performance.

Such fuel cells are generally constructed as comprising an electrolyte membrane, gas diffusion electrodes having a pair of catalyst layers joined to the opposed surfaces of the membrane, and current collectors disposed on the opposed surfaces of the electrodes. The fuel such as hydrogen or methanol is fed to one electrode or anode while the oxidant such as oxygen or air is fed to the other electrode or cathode. An external load circuit is connected between the electrodes. During operation of the fuel cell, protons produced on the anode migrate toward the cathode through the electrolyte membrane and react with oxygen on the cathode to form water.

The electrolyte membrane functions as a migratory medium for protons and as a diaphragm for hydrogen and oxygen gases. It is thus required to have a gas seal ability as well as proton conduction, strength and chemical stability. Also in the case of fuel cells and water electrolysis, peroxides form in a catalyst layer formed at the interface between the electrolyte membrane and the electrode. These peroxides diffuse and become radicals, incurring degradation reaction. This prohibits the use of polymer membranes having poor oxidation resistance.

Most of the electrolyte membranes which are practically acceptable as having high oxidation resistance are fluorine-based membranes possessing a main skeleton of perfluoroalkylene and having ion-exchange groups such as sulfonic or carboxylic acid groups at the end of some perfluorovinyl ether side chains. These fluorine-based membranes are known and commercially available as Nafion® membranes from DuPont, Dow® membranes from Dow Chemical, Aciplex® membranes from Asahi Chemical Industry Co., Ltd., and Flemion® membranes from Asahi Glass Co., Ltd.

These membranes have been practically proven in the brine electrolysis industry owing to their stability, but suffer from the following problems because they are fluoroplastics having sulfonic groups.

1. Fluorinated electrolytes having sulfonic groups are difficult to manufacture and thus very expensive. In the attempt of applying PEFCs to vehicles, the cost of Nafion membranes must be reduced to a fraction as low as one several tenths or one several hundredths before they can be commercially accepted.

2. As the amount of sulfonic groups is increased in order to reduce the electric resistance, the membrane strength is reduced. A membrane with a low electric resistance suffers from rupture and other problems during cell operation. For this reason, Nafion and equivalent membranes pose a limit to the amount of sulfonic groups which can be incorporated, with the upper limit being an ion-exchange capacity of 1.1 milli-equivalent/gram.

3. The existing fluorinated electrolyte membranes having sulfonic groups can be used substantially solely at temperatures below 100° C. This is because in a temperature range higher than the Tg around 120° C. of polymers, the ion channel structure contributing to proton conduction is broken, inhibiting proton conduction through the cluster channels created by water and sulfonic groups in the membrane.

4. No proton conduction is provided in the absence of water. Since ionic conductivity largely depends on the water content of the membrane governed by the humidity of the cell service environment, a strict and complex control of the water content of the membrane by humidifying the fuel is necessary. This makes the structure of the fuel cell more intricate and the device larger-sized, posing a greater burden to the device and even causing failures.

Under the circumstances, other sulfonated polymers such as polyimide, polysulfone, polystyrene, polyphenylene, polyether ether ketone (PEEK) and the like were developed as the polymer electrolyte membranes that can replace the fluorinated electrolyte membranes.

However, the post-sulfonation method of forming the above-described sulfonated copolymer membranes has the following problems associated with its sulfonation step.

1. Since a variety of sulfonation agents used in the sulfonation step are hazardous chemicals, the step cannot be devoid of hazards despite careful handling of agents and deliberate designing of the process unit.

2. In order to introduce sulfone groups into a polymer of styrene skeleton, the introduction of sulfone groups must be carried out for a long period of time or under rigorous sulfonating conditions. Then, there inevitably occur side reactions other than the desired sulfonation reaction. For example, in an attempt to introduce siloxy groups, the elimination of siloxy groups and the formation of crosslinks are inevitable.

This exacerbates the efficiency of introduction, resulting in a degradation of membrane performance, especially a decline of mechanical strength.

3. The sulfonating conditions must be adjusted in order to produce membranes having different ion-exchange capacity. It is quite difficult to strictly control the conditions in a reproducible manner, which is a problem from the standpoint of quality control. There is a demand for a process which can omit the sulfonating step using sulfonating agents.

As discussed above, the currently available electrolytes have many drawbacks and are problematic in that they cannot fully comply with low-humidity/high-temperature operation as encountered in fuel cells or the like. There is thus a desire to have ion-conducting/ion-exchanging materials that can replace the electrolytes. Silicon-based polymers having high oxidation resistance have already been developed.

JP-A 14-184427 discloses a method for preparing a proton-conducting film with heat resistance by forming a crosslinked structure which is a combination of a mercapto group-containing alkoxysilane, boron oxide, and another alkoxysilyl compound, followed by oxidation. With this method, however, the crosslinked structure of a mercapto group-containing alkoxysilane and boron oxide, and the crosslinked structure of a mercapto group-containing alkoxysilane, boron oxide, and another alkoxysilyl compound are available in powder form, and thus these structures alone cannot be formed into a film. Accordingly, for the film formation purpose, these structures must be combined with other polymeric materials. The composite films are not always highly heat resistant for the reason that even though the crosslinked structures themselves are fully heat resistant, the polymeric materials to be combined are less heat resistant.

Also, JP-A 2006-131770 discloses a method for preparing an electroconductive film by forming a crosslinked structure which is a combination of a mercapto group-containing alkoxysilane with another alkoxysilyl compound, followed by oxidation. With this method, however, films having a conductivity of the order that can be evaluated only in terms of surface resistance are merely available. Their application is limited to the field of surface coating. They cannot be used at all in the electrolyte membrane application.

Also described in Solid State Ionics, vol. 74, 105, 1994, is a method for preparing an electrolyte material by combining a mercapto group-containing alkoxysilane with another alkoxysilyl compound, followed by crosslinking and oxidation. Although the material is not specified with respect to its form or the like, it is explicitly described that the material exhibits deliquescence at high humidity, indicating that the material cannot be used as a proton-conducting membrane.

Kaliaguine, Microporous and Mesoporous Materials, vol. 52, 29-37, 2002, reports a method for preparing an electrolyte material having micropores serving as ion channels by mixing a mercapto group-containing alkoxysilane with tetraethoxysilane in a varying ratio, causing the mixture to crosslink in the presence of a surfactant or the like, followed by oxidation. The film obtained by this method, however, does not exert a full effect on the proton conduction at low humidity.

JP-A 2005-89682 discloses a proton-conducting fluoropolyether composition comprising a compound of perfluoropolyether structure, an organosilicon compound having at least two hydrogen atoms, a hydrosilylation catalyst, and a proton conductive agent. However, the proton conductive agent is limited to heteropoly-acids in a substantial sense, and with other agents, crosslinking does not take place to such an extent that a membrane formed therefrom has satisfactory strength.

DISCLOSURE OF THE INVENTION

An object of the invention is to solve the problems of prior art polymer electrolyte fuel cells, and specifically, to provide a perfluoropolyether rubber composition for forming a polymer electrolyte membrane, which composition offers a proton-conducting fluoropolyether membrane having good resistance to oxidative degradation, capable of inhibiting degradation and swelling upon permeation of alcohol, and having improved adhesion to an electrode catalyst. Another object is to provide an ion-conducting polymer electrolyte membrane formed from the composition.

The inventors have found that a silicon-oxygen crosslinked structure which is derived from an organoxysilane having an epoxy group and an organoxysilane having a sulfur atom-containing group convertible into a sulfonic group through oxidation (typically a mercapto group) is combined with a fluoropolyether rubber component having alkenyl groups to form a composite material and that this composite material solves the outstanding problems.

The inventors already proposed in Japanese Patent Application Nos. 2005-373693 and 2006-256741 that membranes having different ion-exchange capacity can be readily obtained by combining a silicon-oxygen crosslinked structure having a sulfonic group resulting from oxidation of a silicon compound having a mercapto group with a silicon-based polymer free of a sulfonic group, rather than the use of a polymer having undergone a step with a sulfonating agent. This method involves admixing a sulfonic group-containing siloxane into a rubber composition in the form of a composition consisting of a high molecular weight polysiloxane and silica, adding a mercapto functional group-containing siloxane thereto, and causing the mixture to crosslink. The resulting electrolyte membrane has both ion conductivity and elasticity. This membrane has rubber elasticity unlike the Nafion membranes, and is additionally gas sealable so that it is best suited as an electrolyte membrane in fuel cells requiring a gas seal.

While the silicone rubber is used as the base material of which the electrolyte membrane is constructed, it is still short in strength. Particularly when a composite material is obtained by combining the silicone rubber with a sulfonic group-containing siloxane in powder form, the resulting electrolyte membrane is short in strength.

Continuing the research work, the inventors have found that a silicon-oxygen crosslinked structure is obtained by simultaneously effecting oxidation and hydrolysis on an organoxysilane having an epoxy group and an organoxysilane having a sulfur atom-containing group convertible into a sulfonic group through oxidation, typically a mercapto group, for thereby forming a composite and converting the sulfur atom-containing group into the sulfonic group, and neutralizing and combining the resulting sulfonic group-containing siloxane with a nitrogen-containing compound; and that this silicon-oxygen crosslinked structure has ionic conduction and serves as a satisfactory proton-conducting material. This is true particularly when a silicon-oxygen crosslinked structure (salt) is similarly obtained using as the nitrogen-containing compound a nitrogen-containing heterocyclic compound selected from among imidazole, pyrazole, triazole, and tetrazole rings.

The membrane of the invention is obtained through the mechanism that a silicon-oxygen crosslinked structure consisting of a nitrogen-containing compound salt of a sulfonic group-containing siloxane and a fluoropolyether rubber component having an alkenyl group are crosslinked with a peroxide. This membrane features good flexibility and mechanical strength, a high proton conductivity, ease of preparation, and a high ion conductivity in a low humidity environment. There is available a polymer electrolyte membrane which has a high proton conductivity, high durability, and satisfactory strength and finds use in fuel cells.

The present invention overcomes the outstanding problems of prior art proton-conducting membranes, and affords a membrane which has ease of preparation, high strength, rubber elasticity, gas sealability, and high heat resistance, and maintains effective proton conduction even at a low humidity. The membrane makes it possible to produce a fuel cell capable of high-temperature operation.

In one aspect, the invention provides a perfluoropolyether rubber composition for forming a polymer electrolyte membrane, comprising (A) 100 parts by weight of an alkenyl-containing perfluoropolyether having a backbone skeleton of the general formula (1):

wherein Rf is a straight or branched perfluoroalkylene group of 1 to 6 carbon atoms and q is an integer of 1 to 500, and containing at least two alkenyl groups in total per molecule, (B) 20 to 400 parts by weight of a silicon-oxygen crosslinked structure having ionic conduction, which is obtained by simultaneously effecting oxidation and hydrolysis on an organoxysilane having an epoxy group and an organoxysilane having a sulfur atom-containing group convertible into a sulfonic group through oxidation for thereby converting the sulfur atom-containing group into the sulfonic group, to form a sulfonic group-containing siloxane and neutralizing it with a nitrogen-containing compound, and (C) 0.1 to 10 parts by weight of a crosslinker in the form of a peroxide.

In a preferred embodiment, the sulfur atom-containing group convertible into a sulfonic group through oxidation is a mercapto group.

In a preferred embodiment, the nitrogen-containing compound is a nitrogen-containing heterocyclic compound selected from among imidazole, pyrazole, triazole, and tetrazole rings.

In a preferred embodiment, the alkenyl-containing perfluoropolyether (A) has the general formula (2):

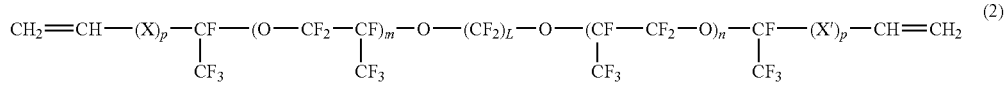

wherein X is —CH$_2$—, —CH$_2$O— or —Y—NR—CO— wherein Y is —CH$_2$— or

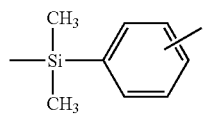

(inclusive of o-, m- and p-positions), and R is hydrogen, methyl, phenyl or allyl, X' is —CH$_2$—, —OCH$_2$— or —CO—NR—Y'— wherein Y' is —CH$_2$— or

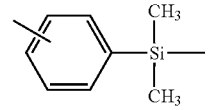

(inclusive of o-, m- and p-positions), and R is as defined above, the subscript p is independently 0 or 1, L is an integer of 2 to 6, and m and n each are an integer of 0 to 200.

In another aspect, the invention provides an ion-conducting polymer electrolyte membrane having rubber elasticity, prepared by processing the perfluoropolyether rubber composition defined above on a hot press at a temperature of 120 to 180° C. for crosslinking and film formation.

BENEFITS OF THE INVENTION

Using the perfluoropolyether rubber composition of the invention, an ion-conducting (or proton-conducting) polymer electrolyte membrane having rubber elasticity can be prepared. This polymer electrolyte membrane is easy and inexpensive to prepare, and has improved ion conduction, high strength, and heat resistance. In particular, the membrane has an elasticity high enough to insure sealability, experiences only a little change of proton conduction capability with a varying humidity, and particularly, exhibits improved proton conduction at a low humidity. Thus the membrane finds use in a wide variety of applications including fuel cells, water electrolysis, hydrogen halide electrolysis, brine electrolysis, oxygen concentrators, humidity sensors, gas sensors, etc.

DESCRIPTION OF THE PREFERRED EMBODIMENT

The perfluoropolyether rubber composition for forming a polymer electrolyte membrane according to the invention comprises (A) an alkenyl-containing perfluoropolyether having a backbone skeleton of the general formula (1):

wherein Rf is a straight or branched perfluoroalkylene group of 1 to 6 carbon atoms and q is an integer of 1 to 500, and containing at least two alkenyl groups in total per molecule, (B) a silicon-oxygen crosslinked structure in the form of a salt of a sulfonic group-containing siloxane with a nitrogen-containing compound, and (C) a crosslinker in the form of a peroxide.

The alkenyl-containing perfluoropolyether polymer (A) used herein contains alkenyl groups, serves as a base in the composition, and largely affects the strength of the composition. Such perfluoropolyether compositions are described, for example, in JP-A 8-199070, JP-A 2000-007835, JP-A 2001-106893, and JP-A 2003-201401, and commercially available under the trade name of SIFEL series from Shin-Etsu Chemical Co., Ltd.

The fluorinated rubber compositions are classified in terms of form into liquid rubber compositions and millable rubber compositions. For integral molding, the millable rubber compositions featuring ease of handling and simple mold configurations are more desirable than the LIMS compositions requiring complex mold configurations.

Component (A) serving as a base in the composition is an alkenyl-containing perfluoropolyether having a backbone of the general formula (1):

$$-(Rf-O)_q- \quad (1)$$

wherein Rf is a straight or branched perfluoroalkylene group of 1 to 6 carbon atoms and q is an integer of 1 to 500, and containing at least two alkenyl groups in total per molecule.

The perfluoropolyether polymer as component (A) has a molecular structure which is preferably a linear or partially branched linear structure. A single polymer or a mixture of polymers having different degrees of polymerization or molecular structures may be used.

Preferably the fluorinated polyether unit has the formula (1):

$$-(Rf-O)_q- \quad (1)$$

wherein Rf is a straight or branched perfluoroalkylene group of 1 to 6 carbon atoms and q is an integer of 1 to 500.

In formula (1), Rf stands for a straight or branched perfluoroalkylene group of 1 to 6 carbon atoms, and preferably 1 to 3 carbon atoms. Examples of units —Rf—O— include —CF$_2$O—, —CF$_2$—CF$_2$—O—, —CF$_2$—CF$_2$—CF$_2$O—, —CF$_2$—CF$_2$—CF$_2$—CF$_2$—O—, —CF$_2$—CF$_2$—CF$_2$—CF$_2$—CF$_2$—O—, —CF(CF$_3$)—CF$_2$—O—, —CF(CF$_3$)—O—, and —C(CF$_3$)$_2$—O—. The polymer may comprise such recurring units of one type or recurring units of two or more types combined. The subscript q is an integer of 1 to 500, preferably 2 to 400, and more preferably 10 to 200.

The alkenyl groups are preferably those groups having 2 to 8 carbon atoms, for example, vinyl, allyl, propenyl, isopropenyl, butenyl, hexenyl, and cyclohexenyl, with those groups terminated with a CH$_2$=CH— structure being more preferred. Of these, vinyl and allyl are most preferred.

The polymer as component (A) should contain at least two alkenyl groups per molecule. The alkenyl groups may be attached to both ends of the backbone of the linear fluoropolyether compound directly or via another atom(s). It is even acceptable that the molecule be separated by such an alkenyl group. From the standpoints of curability and cure physical properties, it is preferred that a linear or branched fluoropolyether compound have alkenyl groups attached directly or indirectly to both ends of its backbone.

Typical examples of such polymers are compounds having the general formula (2):

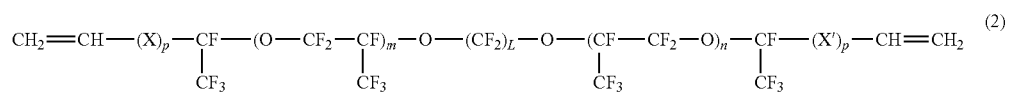

Wherein X is —CH$_2$—, —CH$_2$O— or —Y—NR—CO— wherein Y is —CH$_2$— or

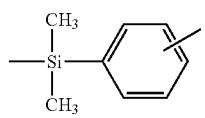

(inclusive of o-, m- and p-positions), and R is hydrogen, methyl, phenyl or allyl, X' is —CH$_2$—, —OCH$_2$— or —CO—NR—Y'— wherein Y' is —CH$_2$— or

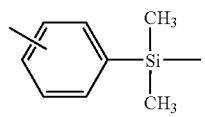

(inclusive of o-, m- and p-positions), and R is as defined above, the subscript p is independently 0 or 1, L is an integer of 2 to 6, and m and n each are an integer of 0 to 200, and preferably 5 to 100.

The fluorinated polyether polymer of formula (2) should desirably have a number average molecular weight (Mn) of 400 to 100,000, and more desirably 1,000 to 50,000, as measured by gel permeation chromatography (GPC) versus polystyrene standards. The compound of formula (2) is typically a linear polymer (wherein recurring units —Rf—O— may be either linear or branched), although it is acceptable that component (A) be a branched compound.

Examples of the fluorinated polyether polymer having formula (2) are given below.

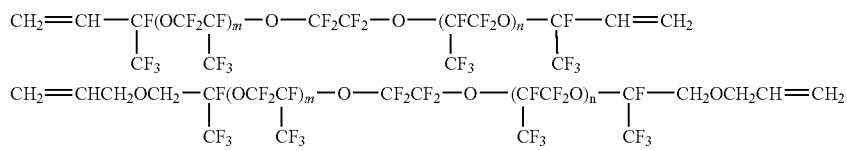

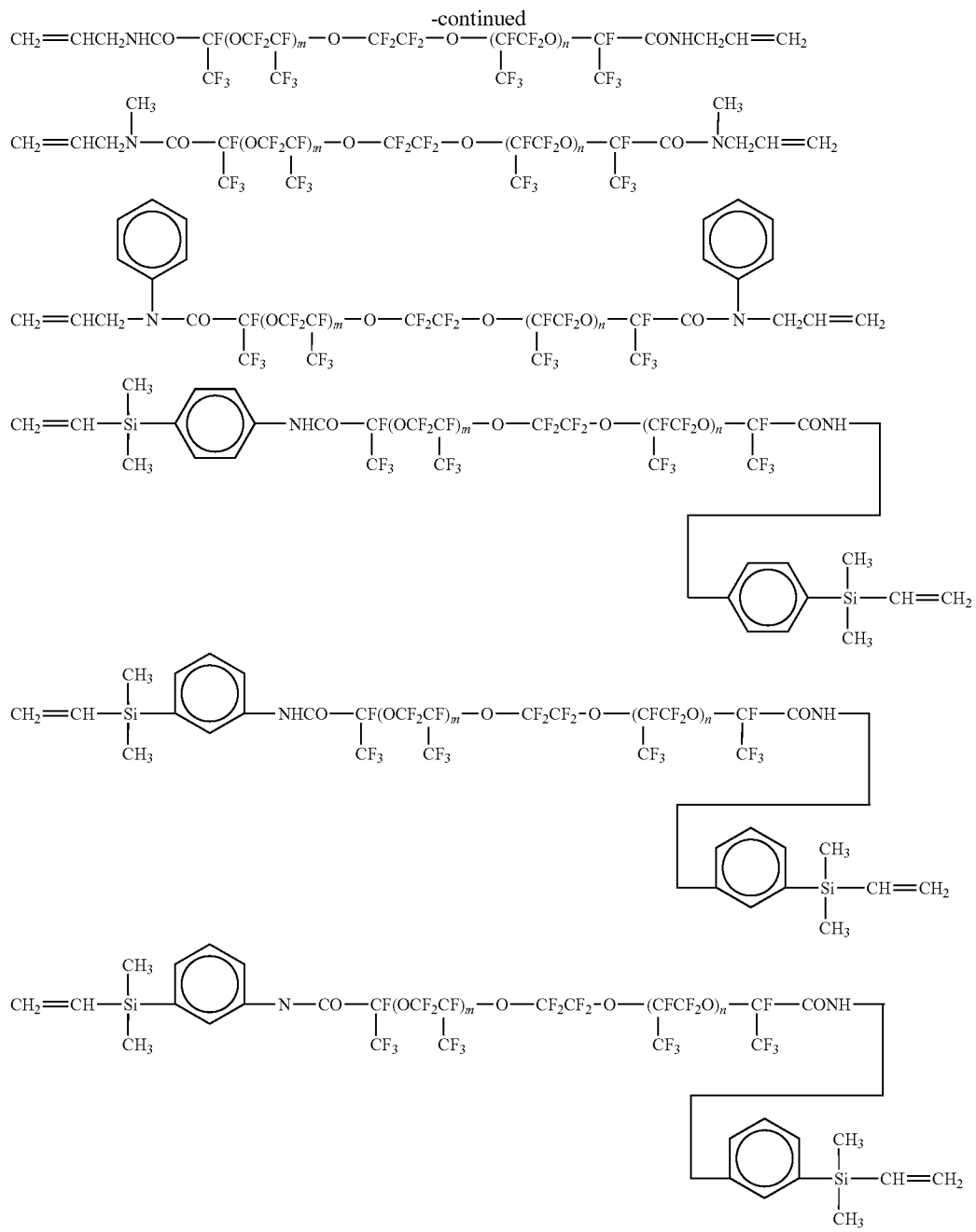

Note that m and n each are an integer of 0 to 200, and preferably 10 to 200.

In the practice of the invention, it is desirable to previously modify the linear fluoropolyether compound to the desired molecular weight in accordance with the intended use. To this end, a linear fluorinated polyether polymer containing alkenyl groups only at both ends of its molecular chain and an organosilicon compound such as an organopolysiloxane containing two SiH groups within a molecule (typically at both ends of its molecular chain) may be subjected to addition reaction through hydrosilylation. The resulting chain-extended product (typically, a fluorinated polyether-siloxane block copolymer having fluorinated polyether moieties at both ends) can be used as component (A).

In this embodiment, the SiH-containing organopolysiloxanes include, but are not limited thereto, those having the general formulae (i) and (ii):

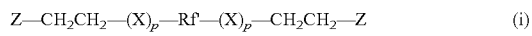
$$Z-CH_2CH_2-(X)_p-Rf'-(X)_p-CH_2CH_2-Z \qquad (i)$$

$$Rf''-(X)_p-CH_2CH_2-Z \qquad (ii)$$

wherein X and p are as defined above, Rf' is a divalent perfluoroalkylene group or divalent perfluoropolyether group, Rf'' is a monovalent perfluoroalkyl group or monovalent perfluoropolyether group, and Z is a group of the general formula (iii):

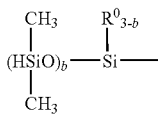

(iii)

wherein $R^0$ is a substituted or unsubstituted monovalent hydrocarbon group, and b is equal to 1, 2 or 3 for compounds of formula (I) or equal to 2 or 3 for compounds of formula (ii).

The amount of SiH groups in the organopolysiloxane of formula (1) or (ii) is preferably such that a molar ratio of SiH group content to alkenyl group content may range from 0.1 to 0.99, and more preferably from 0.3 to 0.8, when the alkenyl-containing polymer of formula (2) is used.

Component (B) is a silicon-oxygen crosslinked structure in the form of a salt of a sulfonic group-containing siloxane with a nitrogen-containing compound. This silicon-oxygen crosslinked structure is obtained by simultaneously effecting oxidation and hydrolysis on an organoxysilane having an epoxy group and an organoxysilane having a sulfur atom-containing group convertible into a sulfonic group through oxidation for composite formation and for thereby converting the sulfur atom-containing group into the sulfonic group, and neutralizing the resulting sulfonic group-containing siloxane with a nitrogen-containing compound. The silicon-oxygen crosslinked structure serves as a proton-conducting material.

Specifically, this silicon-oxygen crosslinked structure serving as component (B) is obtained by simultaneously oxidizing and hydrolyzing an organoxysilane having an epoxy group and an organoxysilane having a sulfur atom-containing group convertible into a sulfonic group through oxidation. Then a silanol resulting from hydrolysis of the organoxysilane having an epoxy group and a silanol having a sulfonic group resulting from oxidation and hydrolysis of the organoxysilane having a sulfur atom-containing group condense with hydroxy groups resulting from ring-opening of epoxy groups, to form a hydrophilic polymer. The sulfonic group-containing siloxane, which is obtained by simultaneously subjecting an organoxysilane having an epoxy group and an organoxysilane having a sulfur atom-containing group convertible into a sulfonic group through oxidation, to oxidation and hydrolysis to combine them into a composite, is then neutralized with a nitrogen-containing compound, yielding a structure having ion conduction.

The structure may be obtained by a first step of preparing a mixed solution of an organoxysilane having an epoxy group and an organoxysilane having a sulfur atom-containing group convertible into a sulfonic group through oxidation and a second step of adding water, oxidizing agent and the like to the solution, simultaneously effecting oxidation and hydrolysis for converting the sulfur atom-containing group into a sulfonic group and combining into a composite, and effecting neutralization reaction with a nitrogen-containing compound, for thereby producing a silicon-oxygen crosslinked structure solution.

Referring to the first step, the reactants from which the silicon-oxygen crosslinked structure is derived include an organoxysilane having an epoxy group and an organoxysilane having a sulfur atom-containing group convertible into a sulfonic group through oxidation.

The organoxysilane having an epoxy group typically has the general formula (1):

$$Y—SiX_nR_{3-n} \quad (I)$$

wherein X is an alkoxy or aryloxy group, Y is an epoxy-containing group, R is a monovalent organic group, and n is an integer of 1 to 3.

In formula (1), Y is a group of the formula (A) or (B).

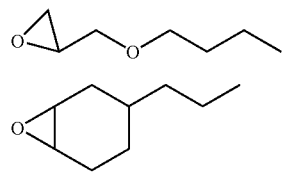

R is a monovalent organic group, generally having up to 6 carbon atoms, preferably up to 3 carbon atoms, and most preferably one carbon atom. Exemplary organic groups include alkyl and alkoxyalkyl groups, with methyl being most preferred.

The alkoxy group represented by X generally has 1 to 10 carbon atoms, preferably up to 6 carbon atoms, and more preferably up to 4 carbon atoms. The aryloxy group represented by X generally has 6 to 12 carbon atoms. If the alkoxy or aryloxy group has more carbon atoms outside the range, the hydrolyzate would have a higher molecular weight. Such a higher molecular weight hydrolyzate is difficult to remove, and when water is used as the solvent, is less compatible with water. For this reason, those groups of relatively less carbon atoms are preferred, and inter alia, alkoxy groups are more preferred. Exemplary alkoxy groups include methoxy, ethoxy, propanoxy, butoxy, methoxymethyl, ethoxymethyl, methoxyethyl, ethoxyethyl, and phenoxy, with methoxy and ethoxy being preferred.

Illustrative examples of the organoxysilane having formula (1) include 3-glycidoxypropyltrimethoxysilane, 3-glycidoxypropyltriethoxysilane, 3-glycidoxypropyltripropoxysilane, 3-glycidoxypropyltri(2-methoxyethoxy)silane, 3-glycidoxypropyldimethoxymethylsilane, 3-glycidoxypropyldiethoxymethylsilane, 3-glycidoxypropyldibutoxymethylsilane, 3-glycidoxypropyldimethylmethoxysilane, 3-glycidoxypropyldimethylpropoxysilane, 5,6-epoxyhexyltrimethoxysilane, 5,6-epoxyhexyltriethoxysilane, β-(3,4-epoxycyclohexyl)-ethyltrimethoxysilane, 3-glycidoxypropyl-bis(trimethylsiloxy)methylsilane, 3-glycidoxypropylmethyldiisopropenoxysilane, and 3-glycidoxypropylpentamethyldisiloxane. Most preferred are 3-glycidoxypropyltrimethoxysilane and 3-glycidoxypropylmethyldimethoxysilane, which are commercially available as KBM-403 and KBM-402, respectively, from Shin-Etsu Chemical Co., Ltd.

The organoxysilane having a sulfur atom-containing group convertible into a sulfonic group through oxidation typically has the general formula (II):

$$Z—(R')—SiX_nR''_{3-n} \quad (II)$$

wherein X is an alkoxy or aryloxy group, Z is a sulfur atom-containing group convertible into a sulfonic acid group through oxidation, R' is a divalent hydrocarbon group, R" is a monovalent hydrocarbon group, and n is an integer of 1 to 3.

In formula (II), Z is a sulfur atom-containing group convertible into a sulfonic acid group through oxidation. Included are substituent groups containing a functional group having a sulfur atom with an oxidation number of up to 5, for example, substituent groups containing a mercapto group, sulfite group or the like. Among others, substituent groups containing a mercapto group are preferred.

The number of sulfur atoms is not particularly limited, but is usually 1. The value of n is 1, 2 or 3. Preferably n is equal to 2 or 3 because the proton conductor may not have an increased strength when n has a smaller value. When n is more than 1, hydrolyzable substituent groups of the same or different type may be included.

R' is a group capable of connecting silicon to the above-mentioned functional group such as mercapto or sulfite group and having less reactivity with the oxidizing agent and solvent, and typically a divalent hydrocarbon group. The number of carbon atoms in the hydrocarbon group is generally up to 12, preferably up to 6, more preferably up to 4, and most preferably from 1 to 3. Exemplary hydrocarbon groups include alkylene, arylene, alkenylene and alkynylene groups, with the alkylene and arylene groups being preferred, and the alkylene groups being most preferred. These groups may contain a substituent group which does not affect the oxidation reaction of sulfur atom. The preferred alkylene groups are those of up to 4 carbon atoms, such as methylene, ethylene, propylene and butylene. The preferred arylene groups are those of up to 9 carbon atoms, such as phenylene, methylphenylene, and dimethylphenylene.

The preferred groups of Z—(R')— include mercaptoalkyl, mercaptoaryl and mercapto groups, with the mercaptoalkyl groups being more preferred. Exemplary mercaptoalkyl groups include mercaptomethyl, 2-mercaptoethyl, and 3-mercaptopropyl. Exemplary mercaptoaryl groups include mercaptophenyl and alkylmercaptophenyl groups in which a benzene ring has a methyl, ethyl or similar group substituted thereon.

The alkoxy and aryloxy groups represented by X are as illustrated in formula (1). The alkoxy groups of relatively less carbon atoms are preferred, with methoxy and ethoxy groups being more preferred. R" is a monovalent hydrocarbon group, generally of up to 6 carbon atoms, preferably up to 3 carbon atoms, and most preferably one carbon atom. Exemplary hydrocarbon groups include alkyl groups, with methyl being most preferred.

Most preferred examples of the organoxysilane having formula (II) are 3-mercaptopropyltrimethoxysilane and 3-mercaptopropylmethyldimethoxysilane, which are commercially available as KBM-803 and KBM-802, respectively, from Shin-Etsu Chemical Co., Ltd.

In the first step of the preparation method, the organoxysilane having an epoxy group and the organoxysilane having a sulfur atom-containing group are thoroughly mixed in the presence of an organic solvent.

Exemplary organic solvents include alcohols, glycol derivatives, hydrocarbons, esters, ketones, and ethers, which may be used alone or in admixture. The organic solvents used herein are usually of 1 to 10 carbon atoms, preferably up to 8 carbon atoms, and more preferably up to 6 carbon atoms.

Suitable alcohols include methanol, ethanol, isopropyl alcohol, n-butanol, isobutyl alcohol, octanol, n-propyl alcohol, and acetylacetone alcohol. Suitable glycol derivatives include ethylene glycol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether, propylene glycol monobutyl ether, ethylene glycol monomethyl ether acetate, propylene glycol monoethyl ether acetate, and propylene glycol monomethyl ether acetate. Suitable hydrocarbons include benzene, kerosene, toluene, and xylene. Suitable esters include methyl acetate, ethyl acetate, butyl acetate, methyl acetoacetate, and ethyl acetoacetate. Suitable ketones include acetone, methyl ethyl ketone, methyl isobutyl ketone, and acetylacetone. Suitable ethers include ethyl ether, butyl ether, 2-α-methoxyethanol, 2-α-ethoxyethanol, dioxane, furan, and tetrahydrofuran.

Of these organic solvents, alcohols which offer a high solubility to epoxy and sulfonic groups and are fully compatible with water are preferred. It is preferred from the standpoints of a compatibility with water and ease of solvent removal that the number of carbon atoms in the alcohols be from 1 to 6, more preferably up to 4, and even more preferably up to 2. Specifically, methanol, ethanol, isopropyl alcohol and butanol are preferred, with methanol and ethanol being more preferred.

In the second step, the mixture solution is contacted with an oxidizing agent, whereby the organoxysilane having an epoxy group and the organoxysilane having a sulfur atom-containing group convertible into a sulfonic group through oxidation undergo cohydrolysis and condensation and the sulfur atom-containing group is oxidized into a sulfonic group. The mixture solution is also contacted with water at the same time as the addition of the oxidizing agent, whereby the acid catalyst (i.e., sulfonic group) facilitates ring-opening of epoxy groups and condensation of silanol groups, converting into a hydrophilic polymer.

The oxidizing agent used herein is not particularly limited as long as the sulfur atom-containing group can be oxidized into a sulfonic group. Those oxidizing agents which are soluble in the solvent such as alcohol or water are preferred. In particular, aqueous hydrogen peroxide is preferred. In an embodiment wherein hydrogen peroxide is used as the oxidizing agent, a solvent containing water or alcohol is used as the solvent, and the above-specified alkoxysilanes are used as the organoxysilanes, hydrolytic condensation reaction of the alkoxysilanes takes place at the same time as the sulfur atom-containing group (typically, mercapto group) in one alkoxysilane is oxidized into a sulfonic group.

In this embodiment, the organoxysilane having an epoxy group and the organoxysilane having a sulfur atom-containing group are preferably used in such a proportion that a molar ratio of the former silane to the latter silane may range from 9:1 to 1:9, and more preferably from 6:4 to 1:9. If the proportion of the organoxysilane having an epoxy group is too low, the resulting silicon-oxygen crosslinked structure becomes more water soluble and can be leached out of the polymer electrolyte membrane. If the same proportion is too high, which suggests a relatively less amount of sulfonic groups, there can result a drop of proton conduction.

The amount of water used for cohydrolytic condensation is preferably at least 1 mole, and more preferably at least 1.5 moles per mole of the total organoxy in the organoxysilanes. The upper limit may be determined as appropriate, and preferably up to 10 moles, and more preferably up to 5 moles. The organic solvent may be used in an amount necessary to permit agitation to form a uniform solution.

The amount of the oxidizing agent used (expressed in equivalent) is at least 3 moles per mole of sulfur atom-containing groups in the organoxysilane. Too small an amount of oxidizing agent may give rise to the problems that oxidation to sulfonic acid is retarded and the hydrolyzate with epoxysilane does not form a uniform solution. Although no particular upper limit is imposed on the amount of oxidizing agent, it is preferred that the amount of oxidizing agent, expressed in equivalent, is up to 5 moles, more preferably up to 4 moles per mole of sulfur atom-containing groups in the organoxysilanes. Too much an amount of oxidizing agent may be uneconomical or cause undesired oxidation reaction, for example, cause oxidation of a neutralizing agent to be used in the subsequent step.

In carrying out the relevant reaction, the temperature and time when the organoxysilanes are contacted with the oxidizing agent are not particularly limited. Most often, the reaction is continued at a temperature of 0 to 100° C. for 2 hours to 3 days. The mixture is preferably held or agitated for a time until a uniform solution is achieved. Under certain conditions, at the stage when all or part of the predetermined amount of oxidizing agent to be contacted is contacted, the solution may solidify or gel to precipitate solids. Even in such a case, once the predetermined amount of oxidizing agent is contacted in its entirety, the reaction mixture is held under such conditions that the solvent may not evaporate, and then a uniform solution of sulfonic group-containing siloxane is yielded.

The molecular structure of sulfonic group-containing siloxane is not particularly limited. Specifically, linear, partially branched linear, branched and network structures are included, with the linear and branched structures being preferred. Although the viscosity may vary, the viscosity at 25° C. is preferably in the range of 1 to 50,000 mPa-s, and more preferably 5 to 1,000 mPa-s. It is noted that the viscosity is measured by a rotational viscometer. In the sulfonic group-containing siloxane according to the invention, the sulfonic groups have formed chemical bonds with silicon atoms through groups which are less reactive to the oxidizing agent and solvent, such as hydrocarbon groups. Accordingly, even when the sulfonic group-containing siloxane is uniformly dissolved in a solvent such as water, the sulfonic groups are not liberated as sulfuric acid. On the other hand, some or all epoxy groups have been converted into hydroxy groups under the action of sulfonic groups, which facilitates working operation when the siloxane is combined and worked with rubber into a compound.

The sulfonic group-containing siloxane solution generally has a concentration of at least 10%, preferably at least 40% by weight, and generally up to 99%, preferably up to 95%, and more preferably up to 80% by weight of the sulfonic group-containing siloxane. A concentration as high as possible is preferred, provided that the siloxane remains dissolved. If necessary, the concentration of siloxane or siloxane-derived silicon in the solution may be adjusted to a desired value by adding water and/or an organic solvent as described above or by removing only the solvent through vacuum distillation or the like. As the organic solvent referred to herein, any of the above-mentioned organic solvent may be used.

Since the solution of sulfonic group-containing siloxane obtained in the way described above is in strong acid form and can induce corrosion of the surrounding or degradation of co-present polymers, it is neutralized with a basic compound.

Neutralization may be made with such basic compounds as aqueous ammonia, potassium hydroxide in water, or sodium methoxide in alcohol. If the sulfonic group-containing siloxane is neutralized and combined with a nitrogen-containing compound into a composite, then the siloxane (or composite) is ready for use as an ion-conducting material even at a low humidity. Inter alia, the preferred nitrogen-containing compounds are nitrogen-containing heterocyclic compounds having imidazole, pyrazole, triazole and tetrazole rings.

In the proton-conducting materials and membranes thereof used so far, water is almost invariably used as the ion-conducting aid. In the application requiring to enhance high-temperature performance as in the present invention, water evaporates at temperatures of 100° C. or above and thus fails to perform well as the ion-conducting aid, whereas the nitrogen-containing heterocyclic compounds can serve for neutralization and as the ion-conducting aid at the same time.

Component (B), which provides an important contribution to ion conduction in the inventive composition, is used in an amount of 20 to 400 parts by weight, preferably 50 to 200 parts by weight per 100 parts by weight of component (A), calculated as the neat component free of the solvent. If the amount of component (B) is less than 20 parts by weight per 100 parts by weight of component (A), then the resulting perfluoropolyether rubber has a substantially reduced ionic conduction. If the amount of component (B) is more than 400 parts by weight, then the resulting composition exhibits a substantially reduced flow and is thus very difficult to handle.

Component (C) or crosslinker serves as a curing agent. The curing mechanism is not particularly limited as long as curing agents are to induce crosslinking and curing by utilizing radical reaction as used in conventional perfluoropolyether rubber compositions. A choice may be made among a variety of well-known curing agents. Organic peroxides are used for the relevant radical reaction. By contrast, the curing mechanism of addition reaction by a combination of a platinum base catalyst with an organohydrogenpolysiloxane fails to form an acceptable film because crosslinking is retarded when nitrogen-containing compounds such as amines are used.

More specifically, organic peroxide curing agents include benzoyl peroxide, 2,4-dichlorobenzoyl peroxide, o-methylbenzoyl peroxide, p-methylbenzoyl peroxide, 2,4-dicumyl peroxide, 2,5-dimethyl-2,5-di(t-butylperoxy)hexane, di-t-butyl peroxide, and t-butyl perbenzoate.

Component (C) is used in a sufficient amount to cause component (A), perfluoropolyether polymer to cure and typically in an amount as commonly added to conventional perfluoropolyether rubber compositions. Specifically, the organic peroxide is used in an amount of 0.1 to 10 parts, and preferably 0.5 to 10 parts by weight per 100 parts by weight of component (A). An amount of 1 to 5 parts by weight is more preferred. Less than 0.1 pbw of the organic peroxide tends to result in a lower crosslinked density and a lower rubber strength. With more than 10 pbw of the organic peroxide, more decomposition residues of the peroxide may be left behind.

The method for preparing the perfluoropolyether rubber composition of the invention is not particularly limited. One typical method involves providing component (B), silicon-oxygen crosslinked structure prepared as described above, mixing it with an alkenyl group-containing perfluoropolyether polymer, removing the solvent, thus forming a mixture having the silicon-oxygen crosslinked structure dispersed in the perfluoropolyether polymer, and adding a crosslinker to the mixture. With respect to component (B), it is recommended that the concentration of siloxane or siloxane-derived silicon in the solution be adjusted to a desired value by adding water and/or an organic solvent as described above or by removing only the solvent through vacuum distillation or the like. Then component (B) is mixed with component (A) and depleted of the solvent, whereby a more uniform mixing is achievable.

Usually, after component (B), silicon-oxygen crosslinked structure in the form of a nitrogen-containing compound salt of a sulfonic group-containing siloxane or a solution thereof is mixed with component (A), the mixture is dried, that is, the solvent is removed by heating preferably at a temperature of 60 to 200° C., more preferably 80 to 180° C., whereby a mixture of uniformly dispersed components (A) and (B) is available. The mixture is further cooled to room temperature, whereupon the crosslinker (C) in the form of a peroxide is added to complete the composition. The drying step may be accomplished by any of well-known techniques including air drying, heat drying, and heating under pressure in an autoclave.

The composition having crosslinker (C) uniformly dispersed in the mixture of components (A) and (B) is heated for crosslinking, thus yielding a proton-conducting polymer electrolyte membrane having rubber elasticity and satisfying both mechanical strength and electroconductive property. Specifically, the perfluoropolyether rubber composition may be crosslinked and formed as a film by working on a hot press at a temperature of 120 to 180° C. The working conditions may be adjusted as appropriate in accordance with the desired film thickness and other factors. When it is desired to form a film of 100 μm thick, the preferred conditions include a temperature of about 80 to 200° C., more preferably about 100 to 180° C., and a time of about 5 seconds to 60 minutes, more preferably about 20 seconds to 30 minutes.

Besides the essential components, optional components may be added to the perfluoropolyether rubber composition of the invention insofar as the objects of the invention are not compromised. Optional components include various additives such as conductive agents, reinforcing fillers, blowing agents, flame retardants, and heat resistance modifiers, as well as reaction regulators, mold release agents, and dispersants for fillers.

A typical reinforcing filler is reinforcing silica powder. The silica powder is added for the purpose of providing the perfluoropolyether rubber with mechanical strength, and should preferably have a specific surface area of at least 50 m²/g, and more preferably 100 to 100 m²/g, for that purpose. Silica with a specific surface area of less than 50 m²/g may result in a cured product having low mechanical strength. Examples of reinforcing silica include fumed silica and precipitated silica. Also acceptable are such silica particles whose surface is hydrophobized by treating with chlorosilane or hexamethyldisilazane. The reinforcing silica powder is preferably added in an amount of 0 to 70 parts, and more preferably 3 to 50 parts by weight per 100 parts by weight of component (A), perfluoropolyether. Besides, colorants such as red iron oxide and extending fillers such as ground quartz and calcium carbonate may be added.

Suitable dispersants include diphenylsilane diol, alkoxysilanes, carbon-functional silanes, silanol-containing low-molecular-weight siloxanes and other compounds commonly used in the art. The addition amount is preferably limited to the minimum so that the objects of the invention are not compromised.

The rubber composition is obtained by first mixing components (A) and (B) on a rubber kneading machine such as a twin-roll mill, Banbury mixer, dough mixer or kneader, until uniform, effecting heat treatment if necessary, and then incorporating component (C) on a twin-roll mill.

The perfluoropolyether rubber composition thus prepared may then be molded into the desired shape of perfluoropolyether rubber by various molding techniques including injection molding, casting, mold-pressure molding and extrusion molding.

If necessary, the resulting membrane is immersed in an acidic aqueous solution whereby it is improved in electric conduction. This step is to regenerate sulfonic groups within the membrane as prepared above. Examples of the acidic solution include aqueous solutions of phosphoric acid, hydrochloric acid and sulfuric acid. Preferably it has a concentration of 0.05N to 5N. Also preferably the immersion temperature is 15 to 35° C., and the immersion time is 1 to 60 minutes.

The polymer electrolyte membrane of the invention has a thickness which is preferably in the range of 1 to 1,000 μm, more preferably 10 to 500 μm, though not particularly limited.

EXAMPLE

Examples of the invention are given below by way of illustration and not by way of limitation. All parts are by weight. Me is methyl, and Ph is phenyl.

[Synthesis of Reactants]

Synthesis Example 1 and Comparative Synthesis Example 1

(1) Preparation of Epoxy/Sulfonic Group-Containing Resin

A reactor was charged with 156.8 parts (0.8 mole) of 3-mercaptopropyltrimethoxysilane (KBM-803 by Shin-Etsu Chemical Co., Ltd.) and 188.8 parts (0.8 mole) of γ-glycidoxypropyltrimethoxysilane (KBM-403 by Shin-Etsu Chemical Co., Ltd.), to which 260 parts of ethanol and 40 parts of distilled water were added at room temperature for dissolving the silanes therein. With stirring, 288 parts (2.54 moles) of 30% aqueous hydrogen peroxide was added dropwise to the solution over 3 hours. During the step, the temperature gradually rose and at the same time, the viscosity increased. Oxidation of mercapto groups and hydrolysis of trimethoxysilanes took place simultaneously, and the reaction mixture became gel-like.

As the gel-like product was further heated in an oil bath at 80° C., it was dissolved again. The solution was heated and agitated at 80° C. for 3 hours, yielding a clear uniform solution having a low viscosity.

The reactor was equipped with an ester condenser. In a nitrogen stream, the solution was further heated and agitated at 80° C. for 3 hours. In this duration, the solution was concentrated by removing the alcohol from the ester condenser, obtaining 552 g of a colorless clear uniform solution.

This solution is a solution of a silicon-oxygen crosslinked structure in a water-based solvent. The silicon-oxygen crosslinked structure is a result that the alkoxysilane having an epoxy group and the alkoxysilane having a mercapto group simultaneously undergo oxidation and hydrolysis so that the mercapto groups are converted into sulfonic groups and some epoxy groups are converted into alcohol groups (hydroxy groups). This solution was quantified for nonvolatile by holding in a dryer at 105° C. for 3 hours, finding a nonvolatile content of 50%. It is an epoxy/sulfonic group-containing resin solution, designated resin solution H(NV50).

This solution was analyzed by dissolving an aliquot (1 g) of the solution in 25 g of water, and titrating with a 0.1N aqueous solution of NaOH (f=1.004) using phenolphthalein as the indicator. The content of sulfonic groups was 2.67 mmol/g.

This uniform solution was further concentrated to dryness by heating at 70° C. for 5 hours in a nitrogen stream. There was obtained a hard resin-like solid, which could be ground on a mortar into a powder. It is an epoxy/sulfonic group-containing resin having a nonvolatile content of 100%, designated comparative resin H(NV100).

(2) Preparation of Neutralized Salt of Epoxy/Sulfonic Group-Containing Resin

Under water cooling, 8 parts of aqueous ammonia (28%) was added dropwise to 100 parts of H(NV50) resin solution for neutralizing the acid. The reactor was equipped with an ester condenser. In a nitrogen stream, the solution was heated and agitated at 70° C. until it was concentrated to a nonvolatile content of 50% by weight. It is an ammonium sulfonate salt-containing resin solution, designated NH4(NV50).

The solution was evaporated to dryness by heating at 70° C. in a nitrogen stream. There was obtained a hard resin-like solid, which could be ground on a mortar into a powder. It is designated NH4(NV100) resin.

(3) Preparation of Imidazole Salt of Epoxy/Sulfonic Group-Containing Resin

To 100 parts of a H(NV50) resin solution, under water cooling, 23 parts of methylimidazole was added dropwise to neutralize the acid. The reactor was equipped with an ester condenser. By heating at 70° C. in a nitrogen stream, the solution was concentrated to a nonvolatile content of 50% by weight. This solution is designated Imid(NV50).

(4) Preparation of Composition (4-1) Preparation of Fluorinated Ether Polymer Compound (SIFEL)
Polymer (A) has the following formula:

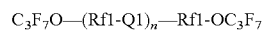

wherein n is equal to 10, Rf1 is

—CF(CF$_3$)—(OCF$_2$CF(CF$_3$))$_p$—OC$_2$F$_4$O—(CF(CF$_3$)CF$_2$O)$_q$—CF(CF$_3$)— wherein p+q=90, Q1 is —CO—NMe-Ph-SiMe$_2$-C$_2$H$_4$—SiMe$_2$-CH$_2$—SiR*Me-CH$_2$—SiMe$_2$-C$_2$H$_4$—SiMe$_2$-Ph-NMe-CO—, and R* is a mixture of 30 mol % of Me and 70 mol % of CH$_2$=CH—C$_6$F$_{12}$—C$_2$H$_4$—.

100 parts of Polymer (A) and 30 parts of VP-NVX300 (fumed silica, Nippon Aerosil Co., Ltd.) were blended on a pressure kneader and heat treated at 160° C. for 2 hours, obtaining a compound. It is a fluorinated polyether compound having a silica content of 23% based on the total nonvolatile matter, designated SIFEL.

On a twin-roll mill, the epoxy/sulfonic acid-containing resin prepared in Synthesis Example (NH4(NV100) resin in Example 1) or solution thereof (NH4(NV50) resin in Example 2 or Imid(NV50) resin in Example 3) was kneaded with the SIFEL, yielding a mixture containing equal weights of these components, calculated as a nonvolatile content. The mixture was heat treated in an oven at 120° C. for 2 hours to fully remove the volatile matter.

On a twin-roll mill, the sulfonic acid-containing resin prepared in Comparative Synthesis Example (H(NV100) resin in Comparative Example 1) was kneaded with the SIFEL, yielding a mixture containing equal weights of these components, calculated as a nonvolatile content. The mixture was heat treated in an oven at 120° C. for 2 hours to fully remove the volatile matter.

(5-1) Blending of Crosslinker for Peroxide Crosslinking: Examples 1 to 3

After step (4-1) where the mixture was kneaded on the twin-roll mill, 100 parts of this compound was combined with 4.0 parts of peroxide C-8B (Shin-Etsu Chemical Co., Ltd.), yielding a crosslinker-laden compound. This compound was press molded at a temperature of 165° C. and a pressure of 50 kgf/cm$^2$ for 10 minutes, forming a sheet of 200 µm thick. The film was post-cured at 120° C. for 4 hours.

An acceptable film was obtained when the sulfonic acid-containing resin was NH4(NV100) resin, NH4(NV50) resin solution or Imid(NV50) resin solution. In the case of H(NV100) resin, an acceptable film was not obtained because of decomposition and discoloration to a dark brown color.

(5-2) Blending of Comparative Crosslinker for Addition Crosslinking: Comparative Example 1

After step (4-1) where the mixture using NH4(NV100) resin as the sulfonic acid-containing resin was kneaded on the twin-roll mill, 100 parts of this compound was combined with 0.6 part of a 50% toluene solution of ethynyl cyclohexanol and 3.7 parts of H-siloxane, identified below. The entire mixture was uniformly agitated, after which 0.5 part of a complex of chloroplatinic acid with 1,3-divinyl-1,1,3,3-tetramethyldisiloxane (Pt concentration 1.0 wt %) was added. The mixture was milled on a twin-roll mill, yielding a compound. This compound was press molded at a temperature of 165° C. and a pressure of 50 kgf/cm$^2$ for 10 minutes, but no crosslink occurred, failing to form an acceptable film.

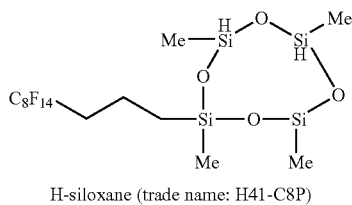

H-siloxane (trade name: H41-C8P)

(6) Preparation of Silicone Rubber Compound

On a kneader, 100 parts of a diorganopolysiloxane gum consisting of 99.50 mol % of (CH$_3$)$_2$SiO units, 0.475 mol % of (CH$_3$)(CH$_2$=CH)SiO units and 0.025 mol % of (CH$_3$)$_2$(CH$_2$=CH)SiO$_{1/2}$ units, 40 parts of Aerosol R-972 (fumed silica, Nippon Aerosil Co., Ltd.), and 5 parts of a hydroxyl-terminated dimethylsilicone oil (degree of polymerization 10, dispersant) were kneaded and heat treated at 160° C. for 2 hours, yielding a compound. It is a silicone rubber compound having a silica content of 27.5% based on the total nonvolatile matter (inclusive of polysiloxane), designated KE-MU.

On a twin-roll mill, the sulfonic acid-containing resin (NH4(NV100) resin in Comparative Example 3) was milled with the KE-MU prepared just above, yielding a mixture containing equal weights of these components, calculated as a nonvolatile content. The mixture was heat treated in an oven at 120° C. for 2 hours to fully remove the volatile matter. 100 parts of this compound was combined with 4.0 parts of peroxide C-8B (Shin-Etsu Chemical Co., Ltd.), yielding a crosslinker-laden compound. This compound was press molded at a temperature of 165° C. and a pressure of 5.0 kgf/cm$^2$ for 10 minutes, forming a sheet of 200 µm thick. The membrane was post-cured at 120° C. for 4 hours.

(7) Acid Treatment of Membrane

The membranes obtained in Examples 1 and 2 and Comparative Example 3 were immersed in a 1N phosphoric acid aqueous solution at room temperature for 30 minutes and washed with water. During the step, alkali ions in sulfonic acid groups in the membranes were exchanged with protons.

(8) Measurement of Physical Properties of Membrane

A test cell was assembled by sandwiching each of the thus obtained membranes between gold-plated copper electrodes. In the case of a low resistance of up to 10 kΩ, a proton conductivity was measured by the AC impedance method (LCR HiTESTER by Hioki E. E. Corp., measurement frequency 0.1 Hz to 5 MHz). Film strength, representative of rubber physical properties, was measured as tensile strength (kgf/cm$^2$) according to JIS K6301. The results are shown in Table 1.

From Table 1 tabulating the properties of electrolyte membranes obtained in Examples and Comparative Examples, it is seen that the proton-conducting fluoropolyether electrolyte membranes within the scope of the invention exhibit strength values of at least 2 times greater over the silicone-based membrane, whether the strength is the initial value or the values after heating and humidity tests. This suggests that they exhibit excellent ion conduction even in a low-humidity environment. These membranes also exhibit rubber elasticity and thus have durable gas sealability, ensuring construction of fuel cells with reliability.

TABLE 1

| | No. | Conditions and units | Example 1 | Example 2 | Example 3 | Comparative Example 1 | Comparative Example 2 | Comparative Example 3 |
|---|---|---|---|---|---|---|---|---|
| Components (pbw) | (A) Fluorinated ether polymer | SIFEL | 100 | 100 | 100 | 100 | 100 | 0 |
| | (A') Comparative silicone rubber | KE-MU | 0 | 0 | 0 | 0 | 0 | 100 |
| | (B) Epoxy-containing sulfonic acid resin | NH4 (NV100) | 100 | 0 | 0 | 0 | 100 | 100 |
| | | NH4 (NV50) | 0 | 200 (net 100) | 0 | 0 | 0 | 0 |
| | | Imid (NV50) | 0 | 0 | 200 (net 100) | 0 | 0 | 0 |
| | (B') Comparative resin | H (NV100) unneutralized | 0 | 0 | 0 | 100 | 0 | 0 |
| | Crosslinker | C-8B[1] | 4 | 4 | 4 | 4 | 0 | 4 |
| | Comparative crosslinker | chloroplatinic acid/regulator/H-siloxane[2] | 0 | 0 | 0 | 0 | 0.5/0.6/3.7 | 0 |
| Film-forming conditions | Mixing and heat treatment | 120° C./2 hr. | Powder mixing | Solution mixing | Solution mixing | Solution mixing | Powder mixing | Powder mixing |
| | Crosslinking mechanism | Peroxide or addition | Peroxide | Peroxide | Peroxide | Peroxide | Addition | Peroxide |
| | Crosslinking behavior | 165° C./10 min. | Good | Good | Good | Decomposed | Not crosslinked | Good |
| | Acid treatment | 0.5N $H_3PO_4$ | Yes | Yes | No | — | — | Yes |
| Film physical properties | Appearance | | White | White | White | Dark brown | White | White |
| | Rubber elasticity | | ○ | ○ | ○ | — | — | ○ |
| | Thickness | μm | 122 | 141 | 246 | — | — | 250 |
| Film strength | Strength (kgf/cm²) | 120° C./4 hr. | 30 | 30 | 56 | — | — | 12 |
| | Strength (kgf/cm²) after heating test | 120° C./3 days | 45 | 48 | 39 | — | — | 21 |
| | Strength (kgf/cm²) after humidity test | 80° C., 95%/3 days | 21 | 20 | 24 | — | — | 10 |
| Electric resistance[4] | Conductivity (S/cm) | RH 100%[3] | $4.4 \times 10^{-3}$ | $1.5 \times 10^{-3}$ | $3.5 \times 10^{-4}$ | — | — | $1.0 \times 10^{-4}$ |
| | Remarks | | $NH_3$ neutralized | Solution dispersed | Solution dispersed imidazole | Unneutralized/decomposed | Non-addition crosslinked | Silicone strength shortage |

[1] C-8B: peroxide (40% pure) by Shin-Etsu Chemical Co., Ltd.
[2] Addition catalyst PL50T/ethynyl 50/H-siloxane, by Shin-Etsu Chemical Co., Ltd.
[3] Immersed in water for 10 minutes, removed and fully dried, prior to measurement
[4] Film size 2.5 cm by 1 cm Japanese Patent Application No. 2006-298447 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A perfluoropolyether rubber composition, comprising
(A) 100 parts by weight of an alkenyl-containing perfluoropolyether having a backbone skeleton of formula (1):

$$—(Rf—O)_q— \quad (1)$$

wherein Rf is a straight or branched perfluoroalkylene group of 1 to 6 carbon atoms and q is an integer of 1 to 500, and containing at least two alkenyl groups in total per molecule,
(B) 20 to 400 parts by weight of a silicon-oxygen crosslinked structure having ionic conduction, which is obtained by simultaneously effecting oxidation and hydrolysis on an organoxysilane having an epoxy group and an organoxysilane having a sulfur atom-containing group convertible into a sulfonic group through oxidation for thereby converting the sulfur atom-containing group into the sulfonic group, to form a sulfonic group-containing siloxane and neutralizing it with a nitrogen-containing compound, and
(C) 0.1 to 10 parts by weight of a crosslinker in the form of a peroxide.

2. The perfluoropolyether rubber composition of claim 1 wherein the sulfur atom-containing group convertible into a sulfonic group through oxidation is a mercapto group.

3. The perfluoropolyether rubber composition of claim 1 or 2 wherein the nitrogen-containing compound is a nitrogen-containing heterocyclic compound selected from the group consisting of imidazole, pyrazole, triazole, and tetrazole rings.

4. The perfluoropolyether rubber composition of claim 1 wherein the alkenyl-containing perfluoropolyether (A) has formula (2):

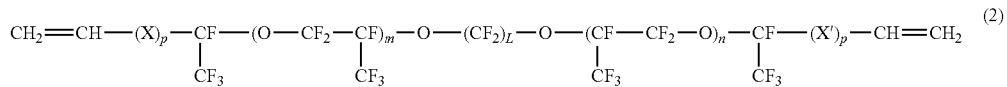 (2)

wherein X is —CH$_2$—, —CH$_2$O— or —Y—NR—CO—
wherein Y is —CH$_2$— or

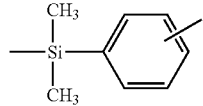

(inclusive of o-, m- and p-positions), and R is hydrogen, methyl, phenyl or allyl, X' is —CH$_2$—, —OCH$_2$— or —CO—NR—Y'— wherein Y' is —CH$_2$— or

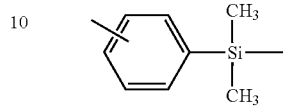

(inclusive of o-, m- and p-positions), and R is as defined above, the subscript p is independently 0 or 1, L is an integer of 2 to 6, and m and n each are an integer of 0 to 200.

5. An ion-conducting polymer electrolyte membrane having rubber elasticity, prepared by processing the perfluoropolyether rubber composition of claim 1 on a hot press at a temperature of 120 to 180° C. for crosslinking and film formation.

* * * * *